Nov. 27, 1923. 1,475,468
R. B. ARMSTRONG
GEAR TRANSMISSION DEVICE
Filed Feb. 1, 1923
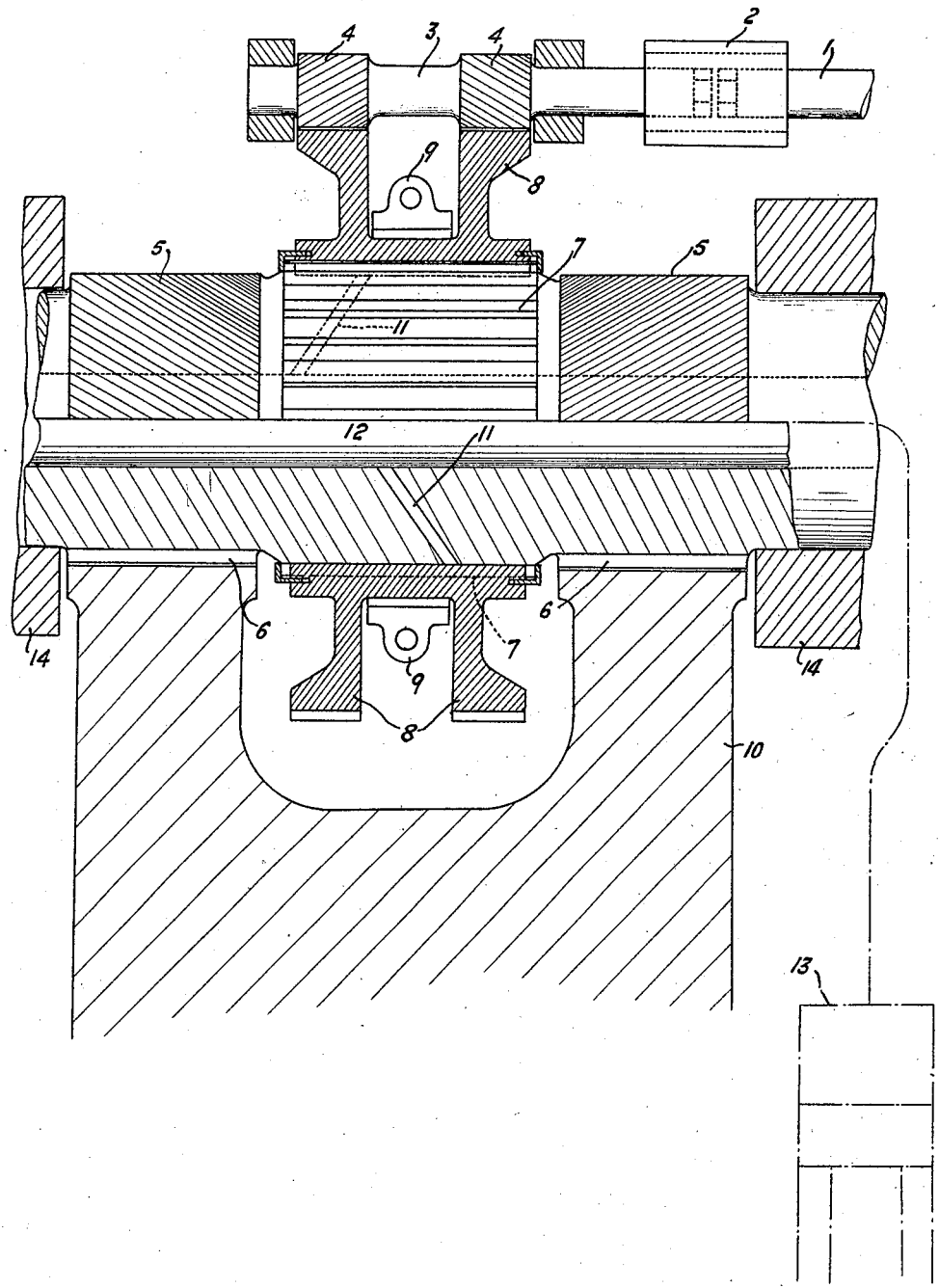
Inventor
Robert Bayler Armstrong
By
Pennie, Davis, Marvin & Edmonds
Attorneys Patented Nov. 27, 1923.

1,475,468

UNITED STATES PATENT OFFICE.

ROBERT BAYLES ARMSTRONG, OF NEWCASTLE-ON-TYNE, ENGLAND, ASSIGNOR TO ROBERT BAYLES ARMSTRONG AND R. & W. HAWTHORN LESLIE & COMPANY, LIMITED, BOTH OF NEWCASTLE-ON-TYNE, ENGLAND.

GEAR TRANSMISSION DEVICE.

Application filed February 1, 1923. Serial No. 616,314.

*To all whom it may concern:*

Be it known that I, ROBERT BAYLES ARMSTRONG, a subject of the King of the United Kingdom of Great Britain and Ireland, and residing at Newcastle-on-Tyne, England, have invented a certain new and useful Improvement in Gear Transmission Devices, of which the following is a specification.

This invention relates to gear transmission devices, particularly for high speed gears where there is employed a train of wheels having helical teeth, and has for its object to provide a construction which will obviate shock and stress due to surging or endwise movement.

In arrangements in which the driven pinion is rigidly attached to the driving or secondary gear wheel the surge or endwise motion of the secondary pinion causes a heavy side stress on the engaging teeth due to the inertia of the secondary gear wheel and secondary pinion, which, if repeated at high frequency, results in fatigue of the material.

According to the invention, in order to obtain axial flexibility or free movement of the secondary pinion independently of the secondary wheel which is mounted thereon, the secondary gear wheel is supported and centralized by means of a suitable journal or journals and the secondary pinion is driven by means of a series of splined keys or steps machined out of the hub of the pinion shaft and the boss of the secondary gear wheel.

To lubricate the splined keys, there is provided means by which oil is conducted from a force pump at high pressure approximating to the pressure per unit area imposed on the keys due to the load, thus ensuring the presence of a film of oil between the surfaces of the driving and driven keys.

The pinion being thus free to float axially, accommodation is afforded for surge or endwise movement of the pinion caused by any mechanical variation in the cutting of the engaging teeth in the secondary gear wheel and the secondary pinion and the working of the same.

The figure of the accompanying drawing is a section of a gear transmission device in which the invention is incorporated.

The mechanism shown includes a driving shaft 1 connected by a flexible coupling 2 to a primary pinion 3, the coupling being arranged to permit the pinion 3 to float axially relatively to the shaft 1. The pinion 3 has oppositely directed helical teeth 4. 5 denotes a secondary pinion which is provided with oppositely directed helical teeth 6 and which is formed with a splined hub 7 whereon is mounted the correspondingly splined boss of a secondary gear wheel 8 which meshes with the pinion 3, the secondary gear wheel 8 being floatable axially on the pinion 6. The teeth of the secondary gear wheel 8 are arranged in spaced rows between which is accommodated a journal 9 supporting and centralizing the secondary gear wheel 8 independently of the secondary pinion 5. A main wheel 10 meshes with the secondary pinion 5.

Lubricant under appropriate pressure is supplied to the loaded faces of the splined hub 7 by way of gutters 11 connecting these faces with the bore 12 of the pinion 5, the lubricant being supplied to the bore 12 by a pump indicated conventionally at 13. 14 denotes bearings for the pinion 5.

I claim:—

1. Gear transmission device comprising, in combination, a driving shaft, a primary pinion axially floatable relatively to and rotatable with said shaft and having oppositely directed helical teeth, a secondary pinion provided with oppositely directed helical teeth, a secondary gear wheel meshing with said primary pinion and axially floatable on and rotatable with said secondary pinion, a journal supporting said secondary gear wheel independently of said secondary pinion, and a main gear wheel meshing with said secondary pinion.

2. Gear transmission device comprising, in combination, a driving shaft, a primary pinion axially floatable relatively to and rotatable with said shaft and having oppositely directed helical teeth, a secondary pinion provided with oppositely directed helical teeth and formed with a splined hub, a secondary gear wheel meshing with said primary pinion and having a splined boss floatingly mounted on the splined hub of said secondary pinion, a journal supporting and centralizing said secondary gear wheel independently of said secondary pinion, and a main gear wheel meshing with said secondary pinion.

3. Gear transmission device comprising, in combination, a driving shaft, a primary pinion axially floatable relatively to and rotatable with said shaft and having oppositely directed helical teeth, a secondary pinion provided with oppositely directed helical teeth and formed with a splined hub, a secondary gear wheel meshing with said primary pinion and having a splined boss floatingly mounted on the splined hub of said secondary pinion, means for supplying lubricant under pressure to the loaded faces of said splined hub, a journal supporting and centralizing said secondary gear wheel independently of said secondary pinion, and a main gear wheel meshing with said secondary pinion.

In testimony whereof I have signed my name to this specification in the presence of two subscribing witnesses.

ROBERT BAYLES ARMSTRONG.

Witnesses:
HELEN CRAIG,
ISABEL ROLLO.